United States Patent [19]

Kitano

[11] 4,117,029
[45] Sep. 26, 1978

[54] HALOGEN-CONTAINING RESIN COMPOSITION CONTAINING ORGANIC SUBSTANCE AS STABILIZER

[75] Inventor: Yoshikazu Kitano, Takatsuki, Japan

[73] Assignee: Nitto Kasei Co. Ltd., Osaka, Japan

[21] Appl. No.: 510,920

[22] Filed: Oct. 1, 1974

[30] Foreign Application Priority Data

Oct. 11, 1973 [JP] Japan .................................. 48-115142
Oct. 19, 1973 [JP] Japan .................................. 48-118363
Nov. 9, 1973 [JP] Japan .................................. 48-126592

[51] Int. Cl.$^2$ ............................................ C08L 63/00
[52] U.S. Cl. .............................. 260/836; 260/45.7 R; 260/45.7 S; 260/45.7 P; 260/45.7 RT; 260/45.75 R; 260/45.75 T; 260/45.75 V; 260/45.75 K; 260/45.75 W; 260/45.8 A; 260/45.8 NT; 260/45.8 NZ; 260/45.85 R; 260/45.9 R; 260/45.95 R
[58] Field of Search ........................................ 260/836

[56] References Cited

U.S. PATENT DOCUMENTS

| | | | |
|---|---|---|---|
| 3,444,122 | 5/1969 | Antifinger | 260/836 |
| 3,463,832 | 8/1969 | Wollrab | 260/836 |
| 3,466,347 | 9/1969 | Davis | 260/836 |
| 3,523,984 | 8/1970 | Clas | 260/836 |
| 3,579,608 | 5/1971 | De Coste | 260/836 |
| 3,652,494 | 5/1972 | Baker | 260/836 |

*Primary Examiner*—Theodore E. Pertilla
*Attorney, Agent, or Firm*—Sherman & Shalloway

[57] ABSTRACT

A halogen-containing resin composition stable to heat and light comprising a halogen-containing resin and a stabilizing amount of a heterocyclic glycidyl compound containing a 5- or 6-membered heterocyclic ring with 2 or 3 nitrogen atoms to at least one of which a glycidyl group is directly bonded.

10 Claims, No Drawings

HALOGEN-CONTAINING RESIN COMPOSITION CONTAINING ORGANIC SUBSTANCE AS STABILIZER

Vinyl chloride resins deteriorate by the influence of heat during processing or as a result of exposure of the final products to sunlight. In order to prevent this deterioration, a number of stabilizers have been used previously. Of these, organic tin compounds, lead compounds and metal soaps have been frequently used because of their superior stabilizing effects. These metal compounds are acceptable stabilizers when used for applications in which their toxicity does not pose any serious problem, but in most cases toxicity of heavy metals is a serious concern where they are used in applications which involve contact with foodstuffs and drinks. Especially, there has recently been a legislative tendency towards the prohibition of lead- and cadmium-containing compounds. Thus, in an attempt to meet this, organic compounds containing no such metal, such as β-aminocrotonic acid esters, diphenylthiourea, α-phenylindole or epoxidized soybean oil, have been suggested. However, these compound have insufficient heat stability, and cannot give vinyl chloride resins sufficient heat stability during processing at high temperatures. Furthermore, vinyl chloride resin processed articles containing these compounds have the serious defect of deteriorating under sunlight.

We have now found that sufficient thermal stability and light stability can be imparted to a halogen-containing resin by incorporating thereinto a small amount of a 5- or 6-membered heterocyclic glycidyl compound containing 2 or 3 nitrogen atoms to at least one of which a glycidyl group is directly bonded.

Accordingly, the present invention provides a halogen-containing resin composition containing the above heterocyclic glycidyl compound which imparts superior thermal stability and light stability to the resin.

The invention further provides a halogen-containing resin composition having a synergistic stabilizing effect as a result of incorporating in it a combination of the above heterocyclic glycidyl compound and a known stabilizer and/or stabilization promotor for vinyl chloride resins.

The 5- or 6-membered heterocyclic glycidyl compound of this invention containing 2 or 3 nitrogen atoms to at least one of which a glycidyl group is directly bonded (this compound will be referred to generically as a heterocyclic glycidyl compound in the present application) may, for example, include glycidyl isocyanurate compounds expressed by the general formula

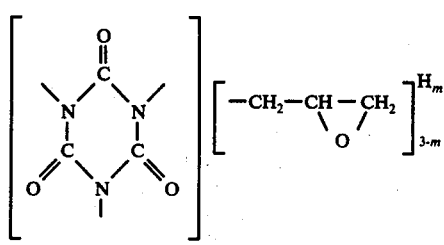

(I)

wherein $m$ is an integer of 0, 1 or 2; glycidyl hydantoin compounds expressed by the general formula

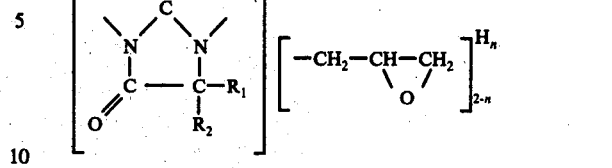

(II)

wherein $R_1$ and $R_2$ independently of each other represent a hydrogen atom or a lower alkyl group containing 1 to 4 carbon atoms, and $n$ is 0 or 1. glycidyl uracil compounds of the following formula

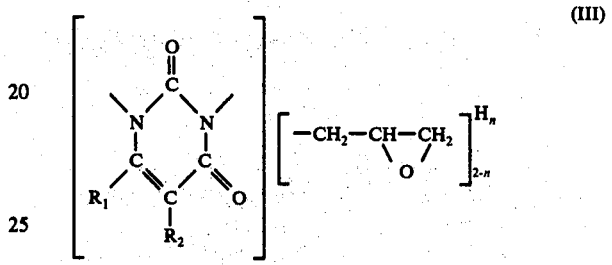

(III)

wherein $R_1$, $R_2$ and $n$ are the same as defined above; glycidyl barbituric acid compounds expressed by the following general formula

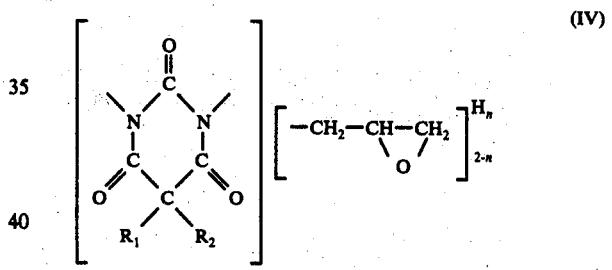

(IV)

wherein $R_1$, $R_2$ and $n$ are the same as defined above; and glycidyl 5,6-dihydrouracil compounds of the following general formula

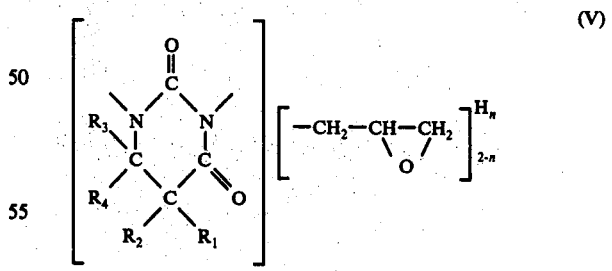

(V)

wherein $R_1$, $R_2$ and $n$ are the same as defined above, and $R_3$ and $R_4$ independently of each other represents a hydrogen atom or a lower alkyl group containing 1 to 4 carbon atom.

A typical example of the compound of the general formula (I) is triglycidyl isocyanurate which is prepared, for example, from isocyanuric acid and epichlorohydrin, and contains triglycidyl isocyanurate as a main constituent and optionally a small amount of diglycidyl and monoglycidyl derivatives.

Examples of the compounds of the general formula (II) are 1(or 3)-glycidyl hydantoin, 5-methyl-1(or 3)-glycidyl hydantoin, 5,5-dimethyl-1(or 3)-glycidyl hydantoin, 1,3-diglycidyl hydantoin, 1,3-diglycidyl-5-methyl hydantoin, 1,3-diglycidyl-5-butyl hydantoin, and 1,3-diglycidyl-5,5-dimethyl hydantoin.

Examples of the compounds of the general formula (III) are 1(or 3)-glycidyl uracil, 1(or 3)-glycidyl-5-(or 6)-methyl uracil, 1,3-diglycidyl-5(or 6)-methyl uracil, and 1,3-diglycidyl-5(or 6)-butyl uracil.

Examples of compounds of the general formula (IV) are 1(or 3)-glycidylbarbituric acid, 1(or 3)-glycidyl-5,5-diethylbarbituric acid, 1,3-diglycidylbarbituric acid, and 1,3-diglycidyl-5,5-diethylbarbituric acid.

Examples of the compounds expressed by the general formula (V) are 1(or 3)-glycidyl-5,6-dihydrouracil, 1,3-diglycidyl-5,5-dimethyl-6-isopropyl-5,6-dihydrouracil, 1,3-diglycidyl-5,5-dimethyl-5,6-dihydrouracil and 3-glycidyl-5,5-dimethyl-5,6-dihydrouracil.

Halogen-containing resins can be stabilized by adding at least one of these compounds.

It has also been found that in order to stabilize halogen-containing resins to a higher level, the heterocyclic glycidyl compound is used in combination with conventional stabilizers and/or auxiliary stabilizers for vinyl chloride resins, and that this can lead to a synergistically increased stability of the halogen-containing resins to heat and light over the case of using the heterocyclic glycidyl compound alone.

The conventional stabilizer or stabilization promotor for vinyl chloride resins used in this invention together with the heterocyclic glycidyl compound is at least one compound selected from the group consisting of organic nitrogen compounds, polyhydric alcohols, organophosphorus compounds, organosulfur compounds, epoxy compounds, phenolic compounds, dicarboxylic acid monoesters, organotin stabilizers, metal soaps stabilizers and lead stabilizers.

Examples of the organic nitrogen compounds are amino acids (derivatives) such as β-aminocrotonic acid esters, hydantoin, phenylaminoacetic acid, and o- or p-aminobenzoic acid esters, urea, urea derivatives such as semicarbazide, monophenylurea, di-o-tolylurea, diphenylurea, N,N'-di-(carbethoxyisopropenyl) urea, or glycidyl ethers of o- or p-hydroxyphenylurea, thiourea, thiourea derivatives such as monophenylthiourea, diphenylthiourea, 1,3-diphenyl-2-thiourea, or monoallylthiourea, guanidine, guanidine derivatives such as diphenyl guanidine, monophenyl guanidine or cyanoguanidine, amines such as dicyandiamide, α- or β-naphthylamine, phenylene diamine, naphthylene diamine, phenyl-β-naphthylamine, aldol α-naphthylamine, hexamethylene tetramine, α-phenyl indole, triethanol amine, p-aminodiphenylamine, trishydroxymethylaminomethane, N,N'-diphenylethylene diamine, 2-N-ethylanilino ethanol, 2-mercaptobenzimidazole, or 2-mercaptobenzothiazole, amides and imides such as formamide, succimide, phthalimide, benzalphthalimide, N-phenyl-β-mercaptopropionamide or thiobenzamide, sulfonamides and aminosulfones such as 4,4'-diaminodiphenyl sulfone, methyl-3-aminophenylsulfone or p-aminobenzolesulfonamide, and compounds analogous to these.

Examples of the polyhydric alcohols are pentaerythritol, dipentaerythritol, mannitol, sorbitol, pentaerythritol stearic acid esters, trimethylol propane, and compounds analogous thereto.

Examples of the organophosphorus compounds are trialkyl phosphites such as triisooctyl phosphite, tridecyl phosphite, trioctadecyl phosphite or tris(2,3-dichloropropyl) phosphite, triaryl phosphites such as triphenyl phosphite, trinonylphenyl phosphite, tris-dinonylphenyl phosphite, tri-o-octylphenyl phosphite, tri-p-decyl phenyl phosphite, tri-p-dodecylphenyl phosphite, tris-o-biphenyl phosphite, dinonylphenyl-o-biphenyl phosphite, di(nonylphenyl) dinonylphenyl phosphite, or di(nonylphenyl) distyrenated phenyl phosphite, aryl dialkyl phosphites such as phenyl diisooctyl phosphite or phenyldidecyl phosphite, diarylalkyl phosphites such as diphenyldecyl phosphite, diphenyl isooctyl phosphite, or diphenyl(tridecyl) phosphite, trilauryl trithiophosphite, diphenyl hydrogen phosphite, dilauryl hydrogen phosphite, distearyl pentaerythritol diphosphite, tetraphenyl tetratridecyl pentaerythritol tetraphosphite, tetraphenyl dipropion glycol diphosphite, 2-t-butyl-α(3-t-butyl-4-hydroxyphenyl)-p-cumenyl bis(p-nonylphenyl) phosphite, hydrogenated 4,4'-isopropylidene diphenol phosphite, 2,2'-di-t-butyl-4,4'-isopropylidene diphenol bis(p-nonylphenyl) phosphite, a condensation product formed between tris(nonylphenyl) phosphite and formaldehyde, and compounds analogous thereto.

Examples of the organic sulfur compounds are thiodipropionic acid, diethylthiodipropionic acid esters, dilaurylthiodipropionic acid esters, dimyristyryl thiodipropionic acid esters, distearyl thiodipropionic acid esters, laurylstearylthiodipropionic acid esters, stearyl-(3,5-dimethyl-4-hydroxybenzyl) thioglycolic acid esters, phenothiazine, lauryl thioether, thiocarboxylic anhydrides, thiobenzoic acid, thiolauric acid, and compounds analogous thereto.

Examples of the epoxy compounds include alkyl and aryl esters of epoxidized fatty acids such as epoxidized soybean oil, epoxidized linseed oil, epoxidized castor oil, epoxidized safflower oil, epoxidized linseed oil fatty acid butyl ester, epoxidized tall oil acid isooctyl ester, epoxidized 1,2-propylene glycol tall oil acid ester, epoxidized 1,3-butylene glycol tall oil acid ester, pentaerythritol tetraester of epoxidized tall oil acid, epoxidized 1,2-propylene glycol oleic acid ester, a 9,10-epoxystearic acid ester of 3,4-epoxycyclohexyl methanol, or a 9,10,12,13-diepoxystearic acid ester of 3,4-epoxycyclohexylmethanol; a 2-ethyl-1,3-hexanediol of 3,4-epoxycyclohexanecarboxylic acid, 3,4-epoxy-6-methylcyclohexanecarboxylate, a di-2-ethylhexyl ester of epoxyhexahydrophthalic acid, glycidyl ethers, epoxy resins, and compounds analogous thereto.

The phenolic compounds are those used as so-called anti-oxidants, such as 2,6-di-t-butyl-4-methyl phenol, bisphenol A, hydrogenated bisphenol A, 2-methyl phenol, 4-t-butyl phenol, 4-t-amyl phenol, 2,6-dimethyl phenol, 4-t-butyl-2-methyl phenol, 6-t-butyl-2-methyl phenol, 4-t-octyl-2-methyl phenol, 4-nonyl-2-methyl phenol, 2,4-di-sec-amylphenol, 2,6-di-t-amylphenol, 2,4-dimethyl-6-t-butyl phenol, 2,4,6-tri-t-butyl phenol, 4,6-di-t-butyl-2-methylphenol, 2,6-di-t-butyl-a-dimethylamino-4-methyl phenol, butylated hydroxy anisole, 4,4'-bis(2,6-di-t-butyl phenol), 4,4'-methylene bis(2-methyl phenol), 4,4'-methylenebis (6-t-butyl-2-methylphenol), 2,2'-methylenebis(4-isooctylphenol), 2,2'-methylenebis(4-methyl-6-t-butylphenol), 4,4'-isopropylidenebis(2-methylphenol), styrenated phenol, 2,6-bis(2'-hydroxy-3'-t-butyl-5'-methylbenzyl)-4-methylphenol, alkyl gallates, guaiacic acid, nordihydroguaiacic acid, p-methoxy phenol, styrenated cresol, phenyl phenol, methyl salicylate, phenyl salicylate, 2,6-di-t-amylhydroquinone, 4-hydroxymethyl-2,6-di-t-butylphenol, 2,6-di-t-butyl-p-phenylphenol, 4,6-dinonyl-o-cresol, 2,2'-methylenebis(4-ethyl-6-t-octylphenol), 2,2'-methylenebis(4-methyl-6-nonylphenol), 2,2'-methylenebis[6-(1-methylcyclohexyl) p-cresol], 4,4'-butylidene bis(6-t-butyl-m-cresol), tris(2-methyl-4-hydroxy-5-t-butyl) butane, tetrakis [methylene-3-(3',5'-di-t-butyl-4'-hydroxyphenyl) propionate] methane, 1,3,5-trimethyl-2,4,6-tris(3,5-di-t-butyl-4-hydroxybenzyl) benzene, n-octadecyl-β-(4'-hydroxy-3',5'-di-t-butylphenyl) propionate, thiobis-(methylbutylphenol), 4,4'-thiobis(6-t-butyl-m-cresol), 2,6-di-t-butylphenol, 2-t-butyl-4-hydroxyanisole, and compounds analogous thereto.

Examples of the dicarboxylic acid monoesters are monoalkyl and monoaryl esters of maleic acid, fumaric acid, malonic acid, succinic acid, adipic acid, sebacic acid, tartaric acid, and phthalic acid. The alkyl group may, for example, be those containing 1 to 18 carbon atoms such as methyl, ethyl, butyl, octyl, dodecyl, octadecyl, or benzyl, and the aryl group may, for example, be phenyl or tolyl. Typical examples of these monoesters are monobutyl maleate, monooctyl maleate, monododecyl fumarate, monobutyl malonate, monooctadecyl succinate, monobutyl adipate, monooctyl adipate, monobutyl sebacate, monooctyl phthalate, monobenzyl phthalate, and monophenyl phthalate.

Examples of the organotin stabilizers are monoalkyl tin oxides, polydialkyl stannan diol ethers, dialkyl tin maleate polymers, dialkyl tin bis(monoalkyl maleates), dialkyl tin bis(monoaryl maleates), monoalkyl tin tris(-monoalkyl maleates), bis(dialkyl tin alkyl maleate) maleates, bis(dialkyl tin aryl maleate) maleates, alkylthiostannoxanes, dialkyl tin dialkyl mercaptides, dialkyl tin diaryl mercaptides, dialkyl tin S,S'-bis(mercapto fatty acid esters), monoalkyl tin S,S',S''-tris(mercapto fatty acid esters), dialkyl tin S,S'-bis(mercapto aromatic acid esters), dialkyl tin S,S'-bis(mercaptoalkyl alcohol esters), dialkyl tin monomercaptide carboxylates, dialkyl tin monomercaptide alcohol esters, dialkyl tin alkyl mercaptide maleate esters, and poly(thiobis-alkyl tin sulfides). In the above compounds, the alkyl group directly bonded to the tin atom may be those containing 1 to 8 carbon atoms, and the alkyl group bonded to the oxygen or sulfur atom may be those containing 1 to 20 carbon atoms. For convenience, the cyclohexyl and benzyl groups are classified here as alkyl groups.

Typical examples of organotin stabilizers are those in which the alkyl group bonded directly to the tin atom is a methyl, butyl or octyl group, the alkyl group bonded to the oxygen or sulfur atom is a methyl, ethyl, butyl, octyl, decyl, dodecyl, octadecyl, cyclohexyl or benzyl group, and the aryl group is a phenyl or tolyl group.

Examples of the metal soap-type stabilizers are magnesium soap, calcium soap, zinc soap, barium soap, cadmium soap, lead soap, and tin soap. Stearic acid, lauric acid, ricinoleic acid, naphthenic acid, 2-ethylhexylic acid, and salicylic acid are the most commonly used aliphatic and aromatic acids which form these metal soaps. Frequently, these metal soaps are used in combination of two or more rather than singularly.

Examples of the lead stabilizers include tribasic lead sulfate, dibasic lead phosphite, dibasic lead stearate, basic lead sulfite, basic lead silicate sulfate, and coprecipitated ortholead silicate-silica.

The heterocyclic glycidyl compounds used as stabilizers in this invention can be applied to any resins containing halogen, but are especially effectively applicable to homopolymers, copolymers and blended resins containing a vinyl halide component. Examples of the homopolymers of vinyl halides are vinyl chloride, vinyl bromide and vinylidene chloride resins. The copolymers may, for example, be those derived from vinyl halides and comonomers such as vinyl acetate, vinyl propionate, vinyl butyrate, styrene, ethylene, propylene, methyl methacrylate, a dialkyl fumarate, a maleic acid compound, or an analogous compound. The blended resins may, for example, be those composed of vinyl halide resins and impact resistant resins such as an MBS(methyl methacrylate/butadiene/styrene) resin, an ABS(acrylonitrile/butadiene/styrene) resin, a copolymer of vinyl acetate/ethylene, or chlorinated polyethylene.

In the present application, the halogen-containing resins denote not only these homopolymers, copolymers, and blended resins themselves, but also halogen-containing resin compositions containing optional conventional additives such as a plasticizers, lubricant, filler, pigment, or ultraviolet absorber.

The stabilized halogen-containing resin composition of this invention can be prepared by mixing the heterocyclic glycidyl compound either alone or together with the conventional stabilizer and/or auxiliary stabilizers with the halogen-containing resins by any known methods such as those employing a mill or mixer.

Generally, the stabilized composition of this invention comprises 100 parts by weight of the halogen-containing resin and 0.1 to 20 parts by weight, preferably 0.1 to 10 parts by weight, of the stabilizer of this invention. When containing the conventional stabilizer, it generally comprises 100 parts by weight of the halogen-containing resin, 0.01 to 15 parts by weight, preferably 0.1 to 10 parts by weight of the heterocyclic glycidyl compound stabilizer, and 0.01 to 10 parts by weight, preferably 0.1 to 7 parts by weight of the conventional stabilizer and/or auxiliary stabilizers selected from the group consisting of organic nitrogen compounds, organic sulfur compounds, epoxy compounds, phenolic compounds, dicarboxylic acid monoesters, organotin stabilizers, metal soap-type stabilizers and lead stabilizers. The ratio of the heterocyclic glycidyl compound used in the present invention to the conventional stabilizer and/or auxiliary stabilizer is not restricted, but generally, it is 20:1 to 1:10. Preferably, the stabilizer of this invention may be used in a larger amount.

Since the heterocyclic glycidyl compound of this invention has good compatibility with the halogen-containing resins, the halogen-containing resin composition of this invention does not lose its transparency even when processed at high temperatures. Furthermore, even when this resin composition is heated at a temperature of, e.g., as high as 180° C. for 90 minutes, it retains its heat stability. In a light resistance test, the halogen-containing resin composition of this invention does not show appreciable changes over prolonged periods of time in comparison with the case of stabilizing the resin with the conventional organic stabilizer alone. Thus, the heterocyclic glycidyl compounds used in this invention are valuable organic stabilizers having an outstanding stabilizing effect.

When the halogen-containing resin composition of this invention containing a stabilizer composition consisting of the heterocyclic glycidyl compound of this invention and conventional stabilizer and/or auxiliary stabilizers for vinyl chloride resins is processed at high temperatures, the resin does not at all loss its transparency, and the composition exhibits far greater heat stability and light resistance than in the case of adding the heterocyclic glycidyl compound alone. Specifically, when such a resin composition is heated at a temperature of as high as 180° C. for 120 minutes, it retains its heat stability, and its light resistance is comparable to one obtainable by the use of an ester maleate type organotin compound already known as a superior light stabilizer.

While the present invention has been described hereinbefore with respect to specific embodiments, the invention is not to be limited thereby but modifications are possible within the spirit and scope of the invention as defined in the specification and the appended claims.

The following Examples illustrate the present invention in greater detail. All parts in these Examples are by weight.

EXAMPLE 1

Three parts of each of the stabilizers shown in Table I below was incorporated in 100 parts of a polyvinyl chloride resin (Geon 103 EP-8, a homopolymer of vinyl chloride having a degree of polymerization 800). The mixture was milled for 3 minutes on two rolls heated at 165° C. to form a sheet having a thickness of 0.7 mm. A test piece was prepared from the sheet, and placed in an oven at 180° C. The heat stability of the test piece was examined every 30 minutes. The results are shown in Table I.

Table I

| Runs Nos. | Stabilizers | Heat stability after the prescribed period (minutes) | | | | |
|---|---|---|---|---|---|---|
| | | 0 | 30 | 60 | 90 | 120 |
| I-1 | Triglycidyl isocyanurate (invention) | Colorless | yellow | Yellowish orange | Deep orange | Black brown |
| I-2 | 1,3-Diglycidyl-5-methyl hydantoin (invention) | Colorless | Yellow | Yellowish orange | Deep orange | Black brown |
| I-3 | 1,3-diglycidyl-5-methyl uracil (invention) | Colorless | Yellow | Yellowish brown | Deep orange | Black |
| I-4 | 1,4-Butandiol β-aminocrotonate (comparison) | Colorless | Brown | Black | — | — |
| I-5 | α-Phenyl indole (comparison) | Colorless | Brown | Black | — | — |
| I-6 | Epoxidized soybean oil (comparison) | Yellow | Reddish brown | Black | — | — |
| I-7 | Epikote 828* (comparison) | Yellow | Brown | Black | — | — |
| I-8 | Calcium stearate/zinc stearate (1:1) (comparison) | Colorless | Black | — | — | — |
| I-9 | Cadmium laurate/barium ricinoleate (1:1) (comparison) | Colorless | Yellow | Black | — | — |
| I-10 | Tribasic lead sulfate (comparison) | White | Yellowish white | Yellowish orange | Brown | Black brown |

*An epoxy compound, a product of Shell Company.

EXAMPLE 2

Five parts of each of the stabilizers shown in Table II below was incorporated in a blended resin composed of 100 parts of a polyvinyl chloride resin (Geon 103 EP-8) and 10 parts of a methylmethacrylate/butadiene/styrene resin (Kane Ace B-12, a product of Kanegafuchi Chemical Co., Ltd., which is a resin obtained by grafting methyl methacrylate and styrene to a butadiene/styrene copolymer), and the mixture was milled for 3 minutes on rolls heated at 160° C. A test piece was prepared from the resulting sheet having a thickness of 0.7 mm. The test piece was placed in an oven at 180° C., and its heat stability was examined every 30 minutes. The results are shown in Table II.

Table II

| Runs Nos. | Stabilizers | Heat stability after the prescribed period in minutes | | | | |
|---|---|---|---|---|---|---|
| | | 0 | 30 | 60 | 90 | 120 |
| II-1 | Triglycidyl isocyanurate invention | Colorless | Yellow | Yellowish orange | Orange | Black |
| II-2 | 1,3-Diglycidyl-5,5-diethyl-barbiturate (invention) | Colorless | Yellow | Yellowish orange | Yellowish brown | Black |
| II-3 | 1,3-Diglycidyl-5,5-dimethyl-6-isopropyl-5,6-dihydrouracil (invention) | Colorless | Yellow | Yellowish orange | Yellowish brown | Black |
| II-4 | 1-Glycidyl hydantoin (invention) | Colorless | Yellow | Yellowish brown | Brown | Black |
| II-5 | 1,4-Butanediol β-aminocrotonate (comparison) | Colorless | Reddish brown | Black | — | — |
| II-6 | α-Phenyl indole (comparison) | Colorless | Black | — | — | — |
| II-7 | Epoxidized soybean oil (comparison) | Yellow | Reddish brown | Black | — | — |
| II-8 | Epikote 828* (comparison) | Yellow | Brown | Black | — | — |

*Epikote 828 is an epoxy compound produced by Shell Corporation.

EXAMPLE 3

Three parts of each of the stabilizers shown in Table III below was incorporated in 100 parts of a polyvinyl chloride resin (Geon 103 EP-8). The mixture was milled for 3 minutes by mixing rolls at 160° C., and formed into a sheet having a thickness of about 0.7 mm. Each of the sheets obtained was tested by a WE-SH-2C type Weather-Ometer (a product of Toyo Rika Kogyo Kabushiki Kaisha), and changes in the color of the sheet were examined after exposure for the prescribed periods of time. The results are shown in Table III.

Table III

| Runs Nos. | Stabilizers | Irradiation time (hours) | | | | | |
|---|---|---|---|---|---|---|---|
| | | 500 | 1000 | 1500 | 2000 | 3000 | 4000 |
| III-1 | Triglycidyl isocyanurate (invention) | No change | No change | No change | Brown | Black brown | Black |
| III-2 | 1,3-Diglycidyl-5-methylhydantoin (invention) | No change | No change | No change | Brown | Black brown | Black |
| III-3 | 1,3-Diglycidyl-5-methyluracil (invention) | No change | No change | Light yellow | Brown | Black brown | Black |
| III-4 | 1,3-Diglycidyl-5,5-diethylbarbituric acid (invention) | No change | No change | No change | Brown | Black brown | Black |
| III-5 | 1,4-butanediol β-aminocrotonate (comparison) | No change | Light brown | Brown | Black | — | — |
| III-6 | α-Phenyl indole (comparison) | Black | — | — | — | — | — |
| III-7 | Epoxidized soybean oil (comparison) | No change | No change | Brown | Black | — | — |
| III-8 | Epikote 828 (comparison) | No change | Light brown | black brown | Black | — | — |
| III-9 | Calcium stearate/zinc stearate (1:1) (comparison) | No change | Light yellow | Brown | Black brown | Black | — |
| III-10 | Cadmium laurate/barium ricinolete (1:1) (comparison) | No change | No change | Light yellow | Brown | Black brown | Black |
| III-11 | Dibutyltin bis(butyl maleate) (comparison) | No change | No change | No change | Light green | Green | Black |

EXAMPLE 4

Each of the stabilizers shown in Table IV below, either alone or together with each of stabilizers or the auxiliary stabilizers shown in Table IV, was added in the amount (total amount being 3 parts) shown in Table IV to 100 parts of a polyvinyl chloride resin (Geon 103 Ep-8). The mixture was milled for 3 minutes on two rolls heated at 160° C. to form a sheet having a thickness of 0.7 mm. A test sample prepared from each of the sheet obtained was placed in an oven at 180° C. It was taken out every 30 minutes, and its heat stability was examined. The results are shown in Table IV. Runs numbered by odd numbers cover examples of the present invention.

Table IV

| Runs Nos. | IV-1 | IV-2 | IV-3 | IV-4 | IV-5 | IV-6 | IV-7 | IV-8 | IV-9 |
|---|---|---|---|---|---|---|---|---|---|
| (Stabilizers) | | | | | | | | | |
| Triglycidyl isocyanurate | 3 | — | 2 | — | 2 | — | 2 | — | 2.5 |
| 1,4-Butandiol β-aminocrotonate | — | 3 | 1 | — | — | — | — | — | — |
| α-Phenyl indole | — | — | — | 3 | 1 | — | — | — | — |
| Trimethylol propane | — | — | — | — | — | 3 | 1 | — | — |
| Trinonylphenyl phosphite | — | — | — | — | — | — | — | 3 | 0.5 |
| Monooctyl maleate | — | — | — | — | — | — | — | — | — |
| Dilauryl thiodipropionate | — | — | — | — | — | — | — | — | — |
| Epoxidized soybeam oil | — | — | — | — | — | — | — | — | — |
| 2,6-di-t-butyl-4-methylphenol | — | — | — | — | — | — | — | — | — |
| Heat stability after the time periods indicated (minutes) | | | | | | | | | |
| 0 | Colorless | Colorless | Colorless | Colorless | Colorless | Colorless | Colorless | Colorless | Colorless |
| 30 | Yellow | Reddish brown/yellow | Light | Brown yellow | Light | Brown | Yellow | Black | Yellow |
| 60 | Yellowish orange | Black | Yellow | Black | Yellow | Black | Yellowish orange | — | orange |
| 90 | Deep brown | — | Brown | — | yellow | — | Brown | — | Brown |
| 120 | Black | — | Black | — | Black brown | — | Black | — | Black |

| Runs Nos. | IV-10 | IV-11 | IV-12 | IV-13 | IV-14 | IV-15 | IV-16 | IV-17 |
|---|---|---|---|---|---|---|---|---|
| (Stabilizers) | | | | | | | | |
| Triglycidyl isocyanurate | — | 2 | — | 2 | — | 2 | — | 2.5 |
| 1,4-Butanediol β-amiocrotonate | — | — | — | — | — | — | — | — |
| α-Phenyl indole | — | — | — | — | — | — | — | — |
| Trimethylol propane | — | — | — | — | — | — | — | — |
| Trinonyl phenyl phosphite | — | — | — | — | — | — | — | — |
| Monooctyl maleate | 3 | 1 | — | — | — | — | — | — |
| Dilauryl thiodipropionate | — | — | 3 | 1 | — | — | — | — |
| Epoxidized soybean oil | — | — | — | — | 3 | 1 | — | — |
| 2,6-di-t-butyl-4-methylphenol | — | — | — | — | — | — | 3 | 0.5 |
| Heat stability after the time periods indicated (minutes) | | | | | | | | |
| 0 | Colorless | Colorless | Red | Colorless | Yellow | Light yellow | Red | Colorless |
| 30 | Red brown | Yellow | Red brown | Yellow | Reddish brown | Yellow | Black | Yellow |
| 60 | Black | Yellowish orange | Black | Orange | Black | Yellow | — | Yellow |
| 90 | — | Brown | — | Reddish orange | — | Reddish orange | — | Brown |
| 120 | — | Black | — | Black | — | Black | — | Black |

EXAMPLE 5

Each of the stabilizers shown in Table V below, either alone or together with each of the stabilizers or the auxiliary stabilizers shown in Table V, was incorporated in a blend consisting of 100 parts of a polyvinyl chloride resin (Geon 103 Ep-8) and 15 parts of a methyl methacrylate/butadiene/styrene resin (Kane Ace B-12, a product of Kanegafuchi Chemical Co., Ltd.) In the amount (the total amount being 4 parts) indicated in Table V. The mixture was milled for 3 minutes on rolls heated at 160° C. to form a sheet having a thickness of 0.7 mm. A test piece was prepared from each of the sheet, and placed in an oven at 180° C. The sheet was taken out every 30 minutes, and its heat stability was examined. The results are shown in Table V. Runs Nos. V-1 to V-3 cover examples using the stabilizer alone, and Runs Nos. V-4 to V-10 are examples using both the stabilizer and the auxiliary stabilizer.

EXAMPLE 6

50 Parts of dioctyl phthalate as a plascicizer and each of the stabilizers shown in Table VI, either alone or together with each of the stabilizers or the auxiliary stabilizers, in the amount (the total amount being 3 to 7 parts) shown in Table VI were added to 100 parts of a polyvinyl chloride resin (Geon 103 Ep-8). The mixture was milled for 3 minutes on rolls heated at 160° C. to form a sheet having a thickness of 0.7 mm. A test piece was prepared from each of the sheets, and placed in an oven at 170° C. It was taken out every 30 minutes, and its heat stability was examined. The results are shown in Table VI.

Table VI

| Runs Nos. | VI-1 | VI-2 | VI-3 | VI-4 | VI-5 | VI-6 | VI-7 | VI-8 | VI-9 | VI-10 |
|---|---|---|---|---|---|---|---|---|---|---|
| (Stabilizers) | | | | | | | | | | |
| Triglycidyl isocyanurate | 3 | — | — | — | 2 | 2 | — | — | 2 | 2 |
| 1-Glycidyl hydrantoin | — | 3 | — | — | — | — | 2 | 2 | — | — |
| Thiodiethylene glycol bis-β-aminocrotonate | × | — | 3 | — | 1 | 1 | 1 | 0.5 | 1 | 1 |
| Dipenylthiourea | — | — | — | 3 | — | — | — | — | — | — |
| Sorbitol | — | — | — | — | — | 0.5 | 0.5 | — | — | — |
| Hydrogenated 4,4'-isopropylidene diphenol phosphite | — | — | — | — | — | — | — | 0.5 | — | 0.5 |
| Epoxyiso-octyl oleate | — | — | — | — | — | — | — | — | 3 | 3 |
| 4,4'-thiobis (6-t-butyl-m-cresol) | — | — | — | — | — | — | 0.5 | 0.5 | — | 0.5 |
| Thiodipropionic acid | — | — | — | — | — | — | — | 0.5 | — | — |
| Monobutyl adipate | — | — | — | — | — | — | 0.5 | — | — | — |
| Heat stability after the time periods indicated (minutes) | | | | | | | | | | |
| 0 | Colorless | Colorless | Colorless | Yellow | Colorless | Colorless | Colorless | Colorless | Colorless | Colorless |
| 30 | Yellow | Yellow | Reddish brown | Black | Pale yellow | Pale yellow | Pale yellow | Pale yellow | Pale yellow | Pale yellow |
| 60 | Yellowish orange | Yellow brown | Black | — | Pale yellow | Pale yellow | Pale yellow | Pale yellow | Pale yellow | Pale yellow |
| 90 | Brown | Brown | — | — | Yellow | Yellow | Yellow | Yellow | Yellow | Yellow |
| 120 | Black | Black | — | — | Brown | Yellowish brown | Yellowish brown | Brown | Yellowish brown | Yellowish brown |

EXAMPLE 7

Triglycidyl isocyanurate and 1,4-butanediol-bis-β-aminocrotonate (known stabilizer) were added in the amounts (total amount being 5 parts) indicated in Table VII to 100 parts of a polyvinyl chloride resin (Geon 103 Ep-8), and the mixture was milled for 3 minutes on two Table V

| Runs Nos. | V-1 | V-2 | V-3 | V-4 | V-5 | V-6 | V-7 | V-8 | V-9 | V-10 |
|---|---|---|---|---|---|---|---|---|---|---|
| (Stabilizers) | | | | | | | | | | |
| Triglycidyl isocyanurate | 4 | — | — | 3 | — | — | 2.5 | 2 | — | — |
| 1,3-diglycidyl-5-methyluracil | — | 4 | — | — | 2 | — | — | — | 2 | — |
| 1,3-diglycidyl-5,5-diethyl barbituric acid | — | — | 4 | — | — | 2.5 | — | — | — | 2 |
| Octyl 3-aminocrotonate | — | — | — | 1 | 1 | 1 | 1 | 1 | 0.5 | — |
| Hydrogenated bisphenol | — | — | — | — | 1 | — | — | — | — | 0.5 |
| Pentaerythritol | — | — | — | — | — | 0.5 | — | 0.5 | — | — |
| Diphenyldecyl phosphite | — | — | — | — | — | — | — | 0.5 | 0.5 | — |
| Lauryl stearyl thiodipropionate | — | — | — | — | — | — | 0.5 | — | — | 0.5 |
| Epoxy isooctyl oleate | — | — | — | — | — | — | — | — | 1.0 | 1.0 |
| Heat stability after time period indicated (minutes) | | | | | | | | | | |
| 0 | Colorless | Colorless | Colorless | Colorless | Colorless | Colorless | Colorless | Colorless | Colorless | Colorless |
| 30 | Yellow | Yellow | Yellow | Light yellow | Light yellow | Light yellow | Light yellow | Light yellow | Light yellow | Light Yellow |
| 60 | Yellowish orange | Yellowish orange | Yellowish orange | Yellow | Yellow | Yellow | Yellow | Yellow | Yellow | Yellow |
| 90 | Deep brown | Deep brown | Deep brown | Yellowish | Brown | Brown | Yellowish | Yellow | Yellowish | Yellow |
| 120 | Black | Black | Black | Black | Black | Black | Black | Deep brown | Black | Deep brown | rolls heated at 165° C. to form a sheet having a thickness of 0.7 mm. A test piece was prepared from each of the sheets obtained, and placed in an oven at 180° C. It was taken out every 30 minutes, and its heat stability was examined.

Furthermore, five sheets obtained above were laminated, and pressed for 10 minutes at 160° C. and at a pressure of 150 Kg/cm² to form a laminated sheet having a thickness of about 3 mm. Its initial coloration and transparency were examined. The results obtained are shown in Table VII.

ride resin (Geon 103 Ep-8), and the mixture was milled for 3 minutes on two rolls heated at 165° C. to form a sheet having a thickness of 0.7 mm. A test piece was prepared from each of the sheets obtained, and placed in an oven at 180° C. It was taken out every 30 minutes, and its heat stability was examined. The results obtained are shown in Table VIII.

In this Example, the heterocyclic glycidyl compound of this invention was compared with the known epoxy compounds by a heat stability test. Runs Nos. VIII-1 to VIII-3 are examples of the present invention, while Runs Nos. VIII-4 to VIII-12 are examples using the known epoxy compounds.

Table VII

| Runs Nos. | VII-1 | VII-2 | VII-3 | VII-4 | VII-5 | VII-6 |
|---|---|---|---|---|---|---|
| (Stabilizers) | | | | | | |
| Triglycidyl cyanurate | 5 | 4 | 3 | 2 | 1 | 0 |
| 1,4-butanediol bis-3-amino-crotonate | 0 | 1 | 2 | 3 | 4 | 5 |
| Heat stability after the time period indicated (minutes) | | | | | | |
| 0 | Colorless | Colorless | Colorless | Colorless | Colorless | Colorless |
| 30 | Yellow | Light yellow | Light Yellow | Light yellow | Light yellow | Reddish brown |
| 60 | Yellowish orange | Yellow | Yellow | Light yellowish brown | Black brown | Black |
| 90 | Orange | Light yellowish brown | Light yellowish brown | Brown | Black | — |
| 120 | Black | Light brown | Black brown | Black | — | — |
| Press test | | | | | | |
| Initial coloration | Light orange | Very pale yellow | Very pale yellow | Very pale yellow | Very pale yellow | Pale yellow |
| Transparency | Excellent | Excellent | Excellent | Excellent | Excellent | Good |

EXAMPLE 8

Four parts of each of the stabilizers shown in Table VIII below was added to 100 parts of a polyvinyl chlo- Table VIII

| Runs Nos. | VIII-1 | VIII-2 | VIII-3 | VIII-4 | VIII-5 | VIII-6 |
|---|---|---|---|---|---|---|
| (Stabilizers) | | | | | | |
| Triglycidyl isocyanurate | 3 | 3 | 3 | — | — | — |
| Epikote 828* | — | — | — | 3 | 3 | 3 |
| Epikote 1004* | — | — | — | — | — | — |
| Diethylene glycl diglycidylether | — | — | — | — | — | — |
| 1,4-butanediol β-aminocrotonate | 0.5 | 0.5 | — | 0.5 | 0.5 | — |
| Dilauryl thiodipropionate | 0.5 | — | 0.5 | 0.5 | — | 0.5 |
| 2,6-di-t-butyl-4-methylphenol | — | 0.5 | 0.5 | — | 0.5 | 0.5 |
| Heat stability after the time period indicaed (minutes) | | | | | | |
| 0 | Colorless | Colorless | Colorless | Colorless | Colorless | Colorless |
| 30 | Pale yellow | Pale yellow | Pale yellow | Yellow | Yellow | Yellow |
| 60 | Yellow | Yellow | Yellow | Black brown | Black brown | Black brown |
| 90 | Light yellowish brown | Yellow | Light brown | Black | Black | Black |
| 120 | Light brown | Light brown | Brown | — | — | — |
| Press test | | | | | | |
| Initial coloration | Very pale yellow | Very pale yellow | Pale yellow | Yellow | Yellow | Yellow |
| Transparency | Excellent | Excellent | Excellent | Excellent | Excellent | Excellent |
| Runs Nos. | VIII-7 | VIII-8 | VIII-9 | VIII-10 | VIII-11 | VIII-12 |
| (Stabilizers) | | | | | | |
| Triglycidyl isocyanurate | — | — | — | — | — | — |
| Epikote 828* | — | — | — | — | — | — |
| Epikote 104* | 3 | 3 | 3 | — | — | — |
| Diethylene glycol diglycidylether | — | — | — | 3 | 3 | 3 |
| 1,4-butanediol η-aminocrotonate | 0.5 | 0.5 | — | 0.5 | 0.5 | — |
| Dilauryl thiodipropionate | 0.5 | — | 0.5 | 0.5 | — | 0.5 |
| 2,6-di-t-butyl-4-methylphenol | — | 0.5 | 0.5 | — | 0.5 | 0.5 |
| Heat stability after the time periods indicated (minutes) | | | | | | |
| 0 | Colorless | Colorless | Very pale yellow | Colorless | Colorless | Colorless |
| 30 | Yellowish brown | Yellowish brown | Yellowish brown | Yellow | Yellow | Yellowish brown |
| 60 | Black | Black | Black | Yellowish brown | Yellowish brown | Brown |
| 90 | — | — | — | Black | Brown | Black |
| 120 | — | — | — | — | black | — |
| Press Test | | | | | | |

Table VIII-continued

| Initial coloration | Light orange | Light orange | Light orange | Yellow | Yellow | Yellow |
|---|---|---|---|---|---|---|
| Transparency | Excellent | Excellent | Excellent | Excellent | Excellent | Excellent |

*Product of Shell Corporation

EXAMPLE 9

The stabilizers or auxiliary stabilizers shown in Table IX were added in the amounts indicated in Table IX to 100 parts of a polyvinyl chloride resin (Geon 103 Ep-8), and the mixture was milled for 3 minutes at 160° C. using a mixing roll thereby to form a sheet having a thickness of about 0.7 mm. The resulting sheet was tested using a WE-SH-2C type Weather-Ometer (a product of Toyo Rika Kagyo Kabushiki Kaisha), and changes in the color of the sheet were examined after exposure for the prescribed periods of time. The results are shown in Table IX. Runs Nos. IX-1 to IX-7 are examples of the present invention, and Runs Nos. IX-8 to IX-16 are examples using known stabilizers or auxiliary stabilizers.

Table IX

| Runs Nos. | IX-1 | IX-2 | IX-3 | IX-4 | IX-5 | IX-6 | IX-7 | IX-8 |
|---|---|---|---|---|---|---|---|---|
| (Stabilizers) | | | | | | | | |
| Triglycidyl isocyanurate | 4 | 3 | 3 | 3 | 3 | 3 | 3 | — |
| 1,4-butanediol β-aminocrotonate | — | 0.5 | 0.5 | 0.5 | — | — | — | 3 |
| Epoxidized soybean oil | — | 0.5 | — | — | 0.5 | 0.5 | — | 0.5 |
| Epikote 828 | — | — | — | — | — | — | — | — |
| Dilauryl thiodipropionate | — | — | 0.5 | — | 0.5 | — | 0.5 | 0.5 |
| 2,6-di-t-butyl-4-methylphenol | — | — | — | 0.5 | — | 0.5 | 0.5 | — |
| Irradiation time (hours) | | | | | | | | |
| 500 | No change | No change | No change | No change | No change | No change | No change | No change |
| 1000 | " | " | " | " | " | " | " | Light yellow |
| 1500 | " | " | " | " | " | " | " | Brown |
| 2000 | Brown | " | " | " | " | " | " | Black |
| 3000 | Black brown | Brown | Light brown | Light brown | Brown | Brown | Light brown | — |
| 4000 | Black | Black | Black brown | Black brown | Black | Black | Black brown | — |

| Runs Nos. | IX-9 | IX-10 | IX-11 | IX-12 | IX-13 | IX-14 | IX-15 | IX-16 |
|---|---|---|---|---|---|---|---|---|
| (Stabilizers) | | | | | | | | |
| Triglycidyl isocyanurate | — | — | — | — | — | — | — | — |
| 1,4-butanediol β-aminocrotonate | 3 | 3 | 0.5 | 0.5 | — | 0.5 | 0.5 | — |
| Epoxidized soybean oil | 0.5 | — | 3 | 3 | 3 | — | — | — |
| Epikote 828 | — | — | — | — | — | 3 | 3 | 3 |
| Dilauryl thiodipropionate | — | 0.5 | 0.5 | — | 0.5 | 0.5 | — | 0.5 |
| 2,6-di-t-butyl-4-methylphenol | 0.5 | 0.5 | — | 0.5 | 0.5 | — | 0.5 | 0.5 |
| Irradiation time (hours) | | | | | | | | |
| 500 | No change | No change | No change | No change | No change | No change | No change | No change |
| 1000 | Yellow | Yellow | Yellow | Yellow | Yellow | Yellow | Light yellow | Light yellow |
| 1500 | Yellow brown | Brown | Black | Black brown | Yellow Brown | Black brown | Brown | Yellow brown |
| 2000 | Black brown | Black | — | Black | Black brown | Black | Black | Black |
| 3000 | Black | — | — | — | Black | — | — | — |
| 4000 | — | — | — | — | — | — | — | — |

EXAMPLE 10

The stabilizers shown in Table X were blended with 100 parts of a polyvinyl chloride resin (Geon 103 Ep-8) in the amounts (the total amount being 3 parts) indicated in Table X, and the mixture was milled for 3 minutes on two rolls at 160° C. to form a sheet having a thickness of about 0.7 mm. A test piece was prepared from each of the sheets obtained, and placed in an oven at 190° C. It was taken out every 15 to 30 minutes, and its heat stability was examined. The results are shown in Table X.

Table X

| Run Nos. | X-1 | X-2 | X-3 | X-4 | X-5 | X-6 | X-7 |
|---|---|---|---|---|---|---|---|
| (Stabilizers) | | | | | | | |
| Triglycidyl isocyanurate | 3.0 | 2.5 | 2.5 | 2.5 | 2.5 | 2.5 | 2.5 |
| Dibutyltin bis(octyl maleate) | — | 0.5 | — | — | — | — | — |
| Dibutyltin bis(benzyl maleate) | — | — | 0.5 | — | — | — | — |
| Dibutyltin dilaurate | — | — | — | 0.5 | — | — | — |
| (Dioctyltin maleate) polymer | — | — | — | — | 0.5 | — | — |
| dioctyltin S,S'-bis(isoctyl mercapto acetate) | — | — | — | — | — | 0.5 | — |
| Poly(thiobis-n-butyltin sulfide) | — | — | — | — | — | — | 0.5 |
| Heat stability after the time periods indicated (minutes) | | | | | | | |
| 0 | Colorless | Colorless | Colorless | Colorless | Colorless | Colorless | Colorless |
| 30 | Yellowish orange | Yellow | Yellow | Yellowish orange | Yellow | Light yellow | Light yellow |
| 60 | Yellowish orange | Yellowish orange | Yellowish orange | Yellowish orange | Yellowish orange | Yellow | Yellow |
| 90 | Deep brown | Yellowish brown | Yellowish brown | Yellowish brown | Yellowish brown | Yellowish orange | Yellowish orange |
| 105 | Black | Deep brown | Deep brown | Deep brown | Deep brown | Yellowish brown | Deep brown |

Table X-continued

| Run Nos. | X-1 | X-2 | X-3 | X-4 | X-5 | X-6 | X-7 |
|---|---|---|---|---|---|---|---|
| 120 | — | Black | Black | Black | Black | Black | Black |

EXAMPLE 11

The stabilizers shown in Table XI were incorporated in the amounts (the total amount being 3 parts) in Table XI to a blend consisting of 100 parts of a polyvinyl chloride resin (Geon 103 Ep-8) and 10 parts of a methyl methacrylate/butadiene/styrene resin (Kane Ace, B-12), and the mixture was milled for 3 minutes on rolls heated at 160° C. to form a sheet having a thickness of 0.7 mm. A test piece was prepared from each of the sheets obtained, and placed in an oven at 180° C. It was taken out every 15 to 30 minutes, and its heat stability was examined. The results are shown in Table XI.

EXAMPLE 12

50 Parts of dioctyl phthalate as a plasticizer and the stabilizers shown in Table XII in the amounts (the total amount being 2 parts) were incorporated in 100 parts of a polyvinyl chloride resin, and the mixture was milled for 3 minutes on rolls heated at 170° C. to form a sheet having a thickness of 0.7 mm. A test piece was prepared from each of the sheets obtained, and placed in an oven at 180° C. It was taken out every 15 minutes, and its heat stability was examined. The results are shown in Table XII. Runs numbered by even numbers are examples of this invention.

Table XI

| Runs Nos. | XI-1 | XI-2 | XI-3 | XI-4 | XI-5 | XI-6 | XI-7 | XI-8 |
|---|---|---|---|---|---|---|---|---|
| (Stabilizers) | | | | | | | | |
| Triglycidyl isocyanurate | 3.0 | — | 2.5 | 2.5 | 2.5 | — | — | — |
| 1,3-diglycidyl-5-methyl hydantoin | — | 3.0 | — | — | — | 2.5 | 2.5 | 2.5 |
| Dioctyltin bis(butyl maleate) | — | — | — | — | — | 0.5 | — | — |
| Dioctyltin dilaurate | — | — | — | — | — | — | 0.5 | — |
| Dibutyltin maleate polymer | — | — | — | — | — | — | — | 0.5 |
| Dibutyltin dilauryl mercaptide | — | — | 0.5 | — | — | — | — | — |
| Dimethyltin S,S'-bis(isoactyl mercaptoacetate) | — | — | — | 0.5 | — | — | — | — |
| Monobutyltin oxide | — | — | — | — | 0.5 | — | — | — |
| Heat stability after the time periods indicated (minutes) | | | | | | | | |
| 0 | Colorless | Colorless | Colorless | Colorless | Colorless | Colorless | Colorless | Colorless |
| 30 | Yellowish orange | Yellowish orange | Light yellow | Light yellow | Light yellow | Yellow | Yellowish orange | Yellow |
| 60 | Yellowish orange | Yellowish orange | Yellow | Yellow | Yellow | Yellowish orange | Yellowish orange | Yellowish orange |
| 90 | Deep brown | Deep brown | Yellowish orange | Yellowish orange | Yellowish orange | Yellowish brown | Yellowish brown | Yellowish brown |
| 105 | Black | Black | Yellowish | Yellowish | Deep brown | Deep brown | Deep brown | Deep brown |
| 120 | — | — | Black | Black | Black | Black | Black | Black |

Table XII

| Runs Nos. | XII-1 | XII-2 | XII-3 | XII-4 | XII-5 | XII-6 | XII-7 | XII-8 | XII-9 | XII-10 |
|---|---|---|---|---|---|---|---|---|---|---|
| (Stabilizers) | | | | | | | | | | |
| Triglycidyl isocyanurate | 2.0 | 1.0 | — | 1.0 | — | 1.0 | — | 1.0 | — | 1.0 |
| Calcium stearate/zinc stearate (1:1 weight ratio) | — | — | — | — | — | — | 1.5 | 0.5 | — | — |
| Cadmium laurate/barium ricinoleate (1:1 weight ratio) | — | — | 2.0 | 1.0 | — | — | — | — | — | — |
| Calcium 2-ethylhexylate/zinc stearate (1:1 weight ratio) | — | — | — | — | 2.0 | 1.0 | — | — | — | — |
| Dioctyltin S,S'-bis(iso-octylmerceptoacetate) | — | — | — | — | — | — | 0.5 | 0.5 | — | — |
| Tribasic lead sulfate | — | — | — | — | — | — | — | — | 2.0 | 1.0 |
| Heat stability after the time periods indicated (minutes) | | | | | | | | | | |
| 0 | Colorless | Colorless | Colorless | Colorless | Colorless | Colorless | Colorless | Colorless | White | White |
| 15 | Black | Light yellow | Light yellow | Light yellow | Black | Light yellow | Light yellow | Colorless | Light yellowish white | Light yellowish white |
| 30 | — | Yellow | Black | Light yellow | — | Yellow | Yellow | Light yellow | Light yellow-brown | Light yellow-white |
| 45 | — | Black | — | Light yellow | — | Black | Black | Light yellow | Light Brown | Light yellow brown |
| 60 | — | — | — | Black | — | — | — | Yellow | Brown | Yellowish brown |
| 75 | — | — | — | — | — | — | — | Black | Deep brown | Brown |

EXAMPLE 13

The stabilizers shown in Table XIII below were blended in the amounts (the total amount being 3 parts) indicated in Table XIII with 100 parts of a vinyl chloride/vinyl acetate copolymer (90:10 weight ratio; degree of polymerization 950) (Denka Vinyl MM-90, a product of Denki Kagaku Kogyo Kabushiki Kaisha), and the mixture was milled for 3 minutes on two rolls heated at 180° C. to form a sheet having a thickness of 0.7 mm. A test piece was prepared from each of the resulting sheets, and placed in an oven at 180° C. It was taken out every 30 minutes, and its heat stability was examined. The results are shown in Table XIII.

Runs Nos. XIII-2, 3, 5, 6, 7, 9 and 10 are examples of the present invention.

Table XIII

| Runs Nos. | XIII-1 | XIII-2 | XIII-3 | XIII-4 | XIII-5 | XIII-6 | XIII-7 | XIII-8 | XIII-9 | XIII-10 |
|---|---|---|---|---|---|---|---|---|---|---|
| (Stabilizers) | | | | | | | | | | |
| Triglycidyl isocyanurate | — | — | — | — | 1.5 | — | — | — | 1.5 | — |
| 1,3-Diglycidyl-5,5-diethylbarbituric acid | — | 1.5 | — | — | — | 1.5 | — | — | — | 1.5 |
| 1,3-Diglycidyl-5-methyluracil | — | — | 1.5 | — | — | — | 1.5 | — | — | — |
| Calcium sterate/zinc stearate (1:1 weight ratio) | 3.0 | 1.5 | 1.5 | — | — | — | — | — | — | — |
| Cadmium stearate/barium stearate (1:1 weight ratio) | — | — | — | 3.0 | 1.5 | 1.5 | 1.5 | — | — | — |
| Tribasic lead sulfate | — | — | — | — | — | — | — | 3.0 | 1.5 | 1.5 |
| Heat stability after the time periods indicated (minutes) | | | | | | | | | | |
| 0 | Colorless | Colorless | Colorless | Colorless | Colorless | Colorless | Colorless | White | White | White |
| 30 | Black | Yellowish orange | Yellowish orange | Yellow | Yellow | Yellow | Yellow | Yellowish white | Yellowish white | Yellowish white |
| 60 | — | Brown | Brown | Black | Yellowish orange | Yellowish orange | Yellowish orange | Brown | Yellowish brown | Yellowish brown |
| 90 | — | Black | Black | — | Black | Black | Black | Black brown | Brown | Brown |

EXAMPLE 14

The stabilizers shown in Table XIV were blended in the amounts (the total amount being 3 parts) indicated in Table XIV below with 100 parts of a polyvinyl chloride resin (Geon 103 Ep-8), and the mixture was milled for 3 minutes by a mixing roll at 160° C. to form a sheet having a thickness of about 0.7 mm. The sheet obtained was tested by a WE-SH-2C type Weather-Ometer (a product of Toyo Rika Kogyo Kabushiki Kaisha), and changes in the color of the sheet after exposure for the prescribed periods of time were examined. The results are shown in Table XIV. Runs Nos. XIV-1 to XIV-4 are examples of the present invention.

Table XIV

| Runs Nos. | XIV-1 | XIV-2 | XIV-3 | XIV-4 | XIV-5 | XIV-6 |
|---|---|---|---|---|---|---|
| (Stabilizers) | | | | | | |
| Triglycidyl isocyanurate | 3.0 | 3.0 | 3.0 | 3.0 | — | — |
| 1,4-Butandiol β-aminocrotonate | — | — | — | — | 3.0 | 3.0 |
| α-Phenylidole | — | — | — | — | — | — |
| Dibutyltin bis(butyl maleate) | 1.0 | — | — | — | 1.0 | — |
| Calcium stearate/zinc stearate (1:1 weight ratio) | — | 1.0 | — | — | — | 1.0 |
| Cadmium laurate/barium ricinoleate (1:1 weight ratio) | — | — | 1.0 | — | — | — |
| Tribasic lead sulfate | — | — | — | 1.0 | — | — |
| Irradiation time (hours) | | | | | | |
| 500 | No change | No change | No change | No change | No change | No change |
| 1000 | " | " | " | " | Light yellow | Brown |
| 1500 | " | " | " | " | Yellowish brown | Black |
| 2000 | " | Light brown | " | " | Black brown | — |
| 3000 | Light brown | Black brown | Brown | Greyish white | Black | — |
| 4000 | Black brown | Black | Black | Black | — | — |

| Runs Nos. | XIV-7 | XIV-8 | XIV-9 | XIV-10 | XIV-11 | XIV-12 |
|---|---|---|---|---|---|---|
| (Stabilizers) | | | | | | |
| Triglycidyl isocyanurate | — | — | — | — | — | — |
| 1,4-Butandiol β-aminocrotonate | 3.0 | 3.0 | — | — | — | — |
| α-Phenylindole | — | — | 3.0 | 3.0 | 3.0 | 3.0 |
| Dibutyltin bis(butyl maleate) | — | — | 1.0 | — | — | — |
| Calcium stearate/zinc stearate (1:1 weight ratio) | — | — | — | 1.0 | — | — |
| Cadmium laurate/barium ricinoleate (1:1 weight ratio) | 1.0 | — | — | — | 1.0 | — |
| Tribasic lead sulfate | — | 1.0 | — | — | — | 1.0 |

Table XIV-continued

| Irradiation time (hours) | | | | | | |
|---|---|---|---|---|---|---|
| 500 | No change | No change | Black brown | Black | Black | Black brown |
| 1000 | Black brown | Yellowish white | Black | — | — | Black |
| 1500 | Black | Yellowish brown | — | — | — | — |
| 2000 | — | Black brown | — | — | — | — |
| 3000 | — | Black | — | — | — | — |
| 4000 | — | — | — | — | — | — |

What we claim is:

1. A vinyl chloride-containing resin composition stable to heat and light consisting of (a) 100 parts by weight of vinyl chloride resin containing at least 87% by weight of vinyl chloride units, (b) from 0.1 to 10 parts by weight of a heterocyclic glycidyl compound containing a 5- or 6-membered heterocyclic ring with 2 or 3 nitrogen atoms to which at least 2 glycidyl groups are directly bonded, and optionally (c) from 0.01 to 10 parts by weight of a conventional stabilizer selected from one of the group consisting of organic nitrogen compounds, organic sulfur compounds, epoxy compounds, phenolic compounds, dicarboxylic acid monoesters, organotin compounds, metallic soap compounds, lead compounds, and polyhydric alcohols.

2. The resin composition of claim 1 wherein said heterocyclic glycidyl compound is selected from the group consisting of glycidyl isocyanurate compounds, glycidyl hydantoin compounds, glycidyl uracil compounds, glycidyl barbituric acid compounds, glycidyl 5,6-dihydrouracil compounds, and mixtures of these.

3. The resin composition of claim 2 wherein said glycidyl isocyanurate compound is triglycidyl isocyanurate.

4. The resin composition of claim 2 wherein said glycidyl hydantoin compound is 1,3-diglycidyl-5-methyl hydantoin.

5. The resin composition of claim 2 wherein said glycidyl uracil compound is 1,3-diglycidyl-5-methyluracil.

6. The resin composition of claim 2 wherein said glycidyl barbituric acid compound is 1,3-diglycidyl-5,5-diethylbarbituric acid.

7. The resin composition of claim 2 wherein said glycidyl 5,6-dihydrouracil compound is 1,3-diglycidyl-5,5-dimethyl-6-isopropyl-5,6-dihydrouracil.

8. The resin composition of claim 1 in which the conventional stabilizer is present.

9. The resin composition of claim 8 wherein the weight ratio of said heterocyclic glycidyl compound to said conventional stabilizer is 20:1 to 1:10, and the conventional stabilizer is present in from 0.1 to 7 parts by weight per 100 parts by weight of said vinyl chloride-containing resin.

10. The resin composition of claim 1 wherein said vinyl chloride-containing resin is selected from the group consisting of homopolymers, copolymers and blended resins containing a vinyl chloride component.

* * * * *